United States Patent [19]
Chase et al.

[11] Patent Number: 5,632,045
[45] Date of Patent: May 27, 1997

[54] ANTIVIBRATION GLOVE

[75] Inventors: David D. Chase, Albuquerque, N.M.; Daniel A. Talonn, University City, Mo.

[73] Assignee: Chase Ergonomics, Inc., Albuquerque, N.M.

[21] Appl. No.: 436,655

[22] Filed: May 8, 1995

[51] Int. Cl.⁶ .................................................. A41D 13/10
[52] U.S. Cl. ........................... 2/161.6; 2/16; 2/167
[58] Field of Search ............................... 2/20, 161.6, 167, 2/16, 267, 161.1, 159

[56] References Cited

U.S. PATENT DOCUMENTS

| | | | |
|---|---|---|---|
| Re. 43,573 | 4/1994 | Calvert | 2/20 |
| 4,051,553 | 10/1977 | Howard | 2/20 |
| 4,624,016 | 11/1986 | Luevano | 2/161.1 |
| 4,756,949 | 7/1988 | Spence et al. | 428/159 |
| 4,808,469 | 2/1989 | Hiles | 428/318.6 |
| 4,980,386 | 12/1990 | Tiao et al. | 521/108 |
| 5,121,962 | 6/1992 | Weber et al. | 297/214 |
| 5,159,717 | 11/1992 | Drew et al. | 2/20 |
| 5,214,799 | 6/1993 | Fabry | 2/20 |
| 5,257,418 | 11/1993 | Jaskiewicz | 2/20 |
| 5,274,846 | 1/1994 | Kolsky | 2/20 |
| 5,285,529 | 2/1994 | Arena | 2/16 |
| 5,345,609 | 9/1994 | Fabry et al. | 2/20 |
| 5,410,756 | 5/1995 | Hutson | 2/16 |

*Primary Examiner*—Amy B. Vanatta
*Attorney, Agent, or Firm*—Polster, Lieder, Woodruff & Lucchesi

[57] ABSTRACT

An antivibration glove includes a glove body with a front and back and a vibration dampener essentially disposed in the interior of the glove toward the palm side of the glove. The vibration dampener has at least a first layer composed of a viscoelastic material having a Shore 00 durometer of less than 50 and a rebound percentage of less than 20. Preferably the vibration dampener also includes second and third layers, coterminous with the first layer, which are composed of a foam material. The viscoelastic layer may have a non-uniform shape, such as precurved, tapered, or the like. In one embodiment the layer of viscoelastic material is relatively thicker near the glove palm area and ball of the thumb and relatively thinner adjacent the finger portion of the glove. The viscoelastic material may be creased to facilitate bending of the glove. The glove attenuates at least 40% of the applied vibration occurring in the range of from 200 Hz to 1250 Hz.

31 Claims, 3 Drawing Sheets

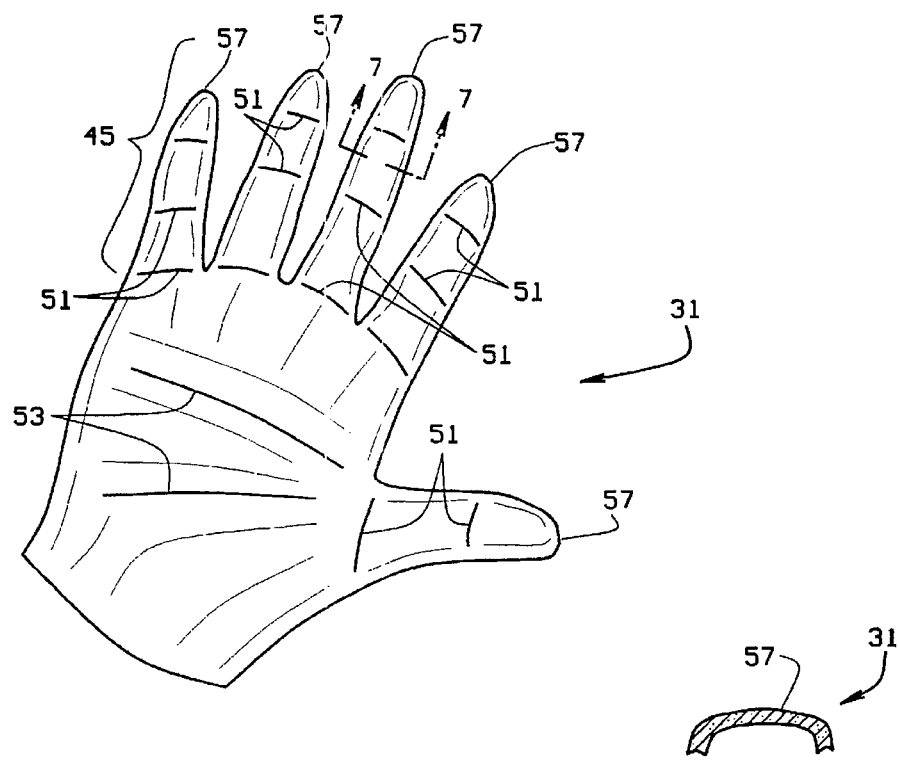
FIG. 6
FIG. 7
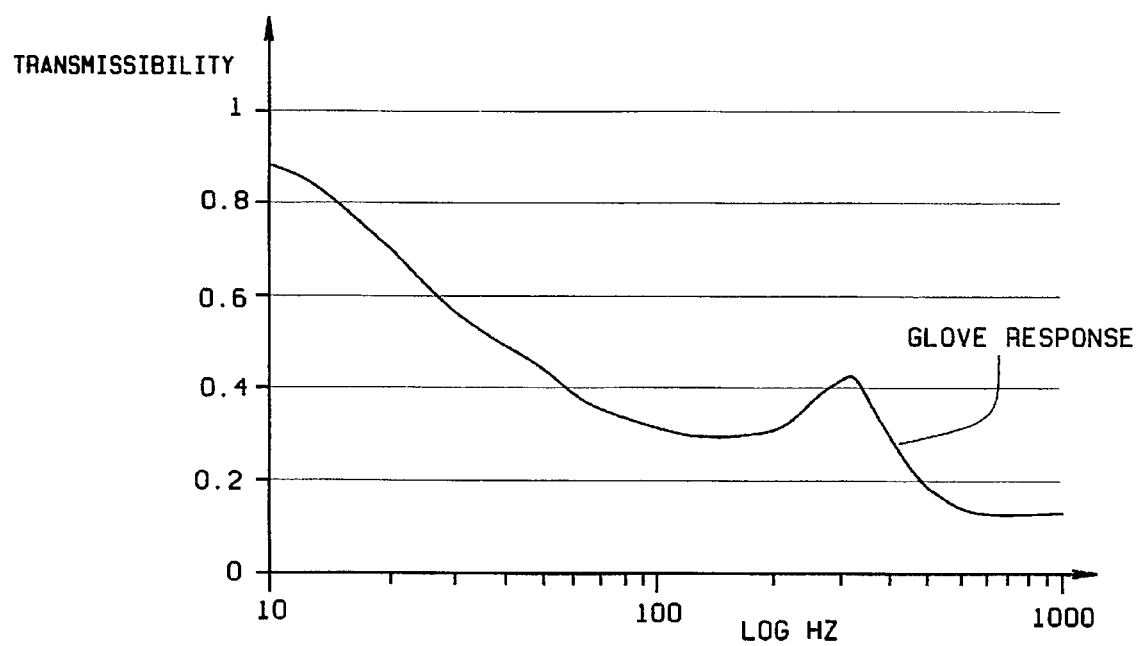
FIG. 8

1

ANTIVIBRATION GLOVE

BACKGROUND OF THE INVENTION

This invention relates to work gloves, and more particularly to gloves designed to attenuate the vibration encountered in using tools.

Various hand held tools and pieces of machinery are sources of substantial amounts of vibration during use. Such tools include power saws and drills, rivet guns, jack hammers, and any number of similar tools. Extensive use of such equipment may result in injury to the human user and significant disability.

Protective gloves have been proposed to shield the user from these effects. However, prior art gloves do not completely solve the problem. It has been found that currently available gloves in fact do not adequately attenuate applied vibration. In addition, it has been found that increasing the amount of vibration dampening material in currently available gloves to the point where attenuation is adequate results in a glove which is so thick or bulky that manipulation and control of hand tools is significantly impaired. In addition, such gloves tend to be uncomfortable for the user.

Although most of the vibration is transmitted to the user through the user's palm, it is also necessary to protect the user's fingers from vibration. The problems of bulkiness and control are, of course, accentuated in trying to shield the fingers from vibration.

The European Committee for Standardization has enacted certain standards for antivibration gloves to address the problems addressed above, but it is not believed that any prior art gloves meet the standard without increasing the amount of vibration dampening material so much as to severely hinder the manipulation and control of the glove. This standard, CEN/231/3 N70E, provides for measuring the transmissibility (or alternatively, the attenuation) of vibration in two different frequency ranges under conditions specified in the standard. In the lower frequency range, from 31.5–200 Hz, the transmissibility may not exceed 1.0. Thus, in this range the gloves are not allowed to amplify vibration. In the higher frequency range, from 200 Hz to 1250 Hz, the transmissibility must be less than 0.6 (i.e., at least 40% attenuation). That is, in the higher range, the gloves must reduce vibration to 60% or less of the level measured when the operator is not wearing gloves. This standard is hereby incorporated herein by reference, including the testing procedure set forth therein. It should be understood that whenever the term "transmissibility" or its converse "attenuation" is used herein, it is intended that such be measured in accordance with the aforementioned standard.

SUMMARY OF THE INVENTION

Among the various objects and features of the present invention may be noted the provision of an improved antivibration glove which reduces vibration induced injury to a human user.

Another object is the provision of such an antivibration glove which meets the European standard.

A third object is the provision of such an antivibration glove which is relatively comfortable to wear and does not unduly restrict the movements of a human wearer.

A fourth object is the provision of such an antivibration glove which protects not only the palm and wrist, but also the fingers of a human wearer.

Other objects and features will be in part apparent and in part pointed out hereinafter.

Briefly, in a first aspect of the present invention, an antivibration glove includes a glove body having a glove front and a glove back which define an opening for accepting a human hand and a recess for receiving the hand. A vibration dampener is essentially disposed in the glove recess adjacent the glove front. The dampener has at least first and second generally coterminous layers, the first coterminous layer being composed of a viscoelastic material having a Shore 00 durometer of less than 50 and a rebound percentage of less than 20, and the second coterminous layer being composed of a foam material. In a second aspect of the present invention, an antivibration glove includes a glove body having a glove front and a glove back which define an opening for accepting a human hand and a recess for receiving the hand. A vibration dampener disposed in the glove recess adjacent the glove front includes a layer of viscoelastic material having gas-filled voids of a predetermined size and density disposed therein.

In a third aspect of the present invention, an antivibration glove includes a glove body having a glove from and a glove back which define an opening for accepting a human hand and a recess for receiving the hand. A vibration dampener disposed in the glove recess adjacent the glove front includes a viscoelastic molded member of a predetermined non-uniform shape.

In a fourth aspect of the present invention, an antivibration glove includes a glove body having a glove front and a glove back which defines an opening for accepting a human hand and a recess for receiving the hand. A vibration dampener disposed in the glove recess adjacent the glove front includes a layer of viscoelastic material extending generally from the glove opening to the opposite end of the glove. The layer of viscoelastic material is relatively thicker near the glove palm area and ball of the thumb and relatively thinner adjacent the finger portion of the glove front.

In a fifth aspect of the present invention an antivibration glove includes a glove body having a glove from and a glove back defining an opening for accepting a human hand and a recess for receiving the hand. A vibration dampener disposed in the glove recess adjacent the glove front includes a layer of viscoelastic material disposed adjacent at least the palm portion of the glove front. The layer of viscoelastic material is creased so as to facilitate manipulation of the glove.

In a sixth aspect of the present invention an antivibration glove includes a glove body having a glove front and a glove back which define an opening for accepting a human hand and a recess for receiving the hand. A vibration dampener disposed in the glove recess adjacent the glove front has a layer of viscoelastic material disposed at least adjacent to the palm portion of the glove front, said layer of viscoelastic material being preformed in a curved shape corresponding at least partially to a rest position of a human hand.

In a seventh aspect of the present invention, an antivibration glove includes a glove body having a glove front and a glove back which define an opening for accepting a human hand and a recess for receiving the hand. A vibration dampener disposed in the glove recess adjacent the glove front extends from the palm portion to the finger portion of the glove front and dampens applied vibration in the range of from 200 Hz to 1250 Hz by at least 40% for both the palm portion and the finger portion of the glove.

BRIEF DESCRIPTION OF THE DRAWINGS

FIG. 6 is a front elevation of a preferred construction of a layer of viscoelastic material used in the vibration dampener of FIG. 3;

FIG. 7 is a cross-sectional view taken along line 7—7 of FIG. 6;

FIG. 8 is a graphical representation of the transmissibility (attenuation) of an example of the antivibration glove of the present invention.

Similar reference characters indicate similar parts throughout the several views of the drawings.

DESCRIPTION OF THE PREFERRED EMBODIMENTS

Figure 1:
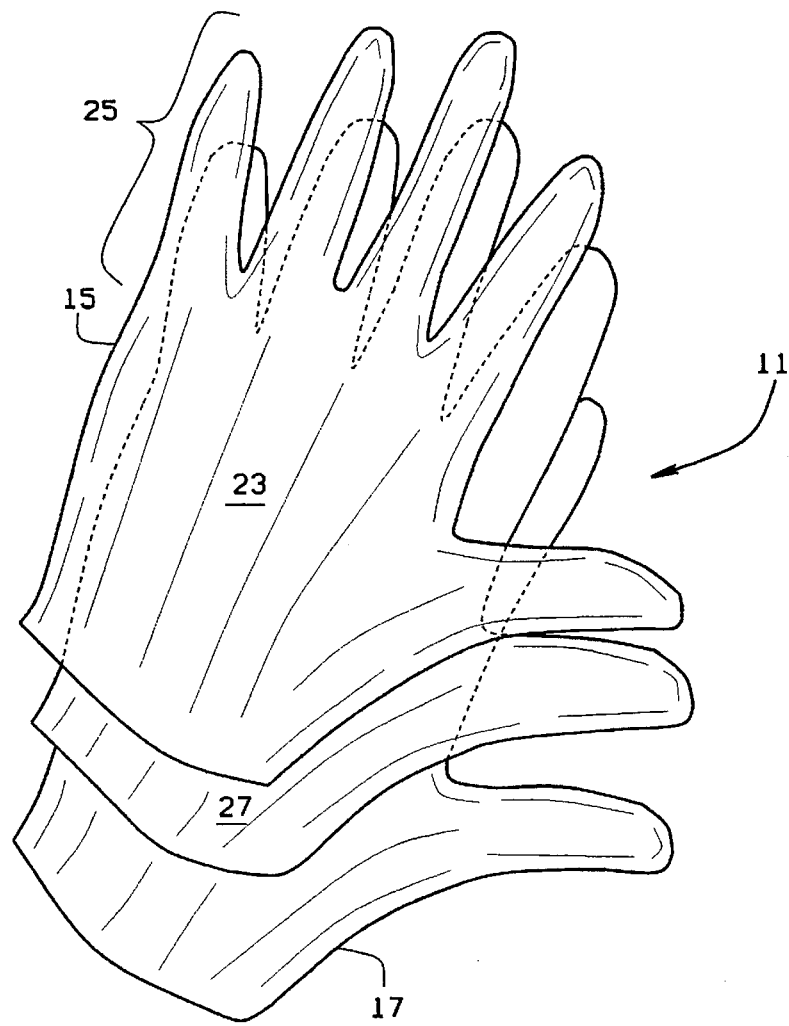
FIG. 1 is an exploded view illustrating the various components of an antivibration glove of the present invention.
Figure 2:
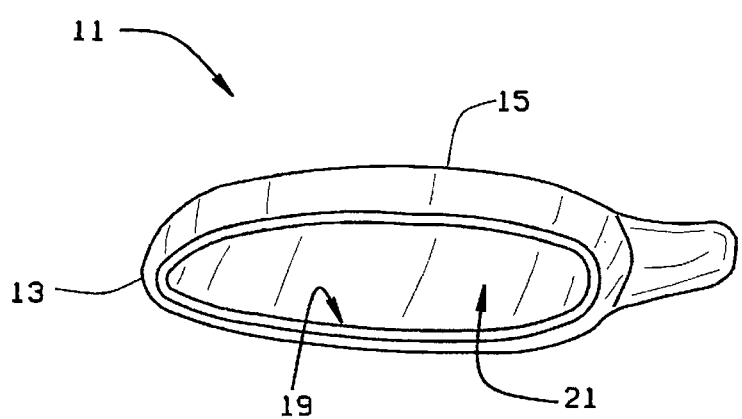
FIG. 2 is a base view of the antivibration glove of FIG. 1.

Turning now to the drawings and specifically to FIGS. 1 and 2, there is shown an antivibration glove 11 of the present invention. Glove 11 includes a glove body 13 having a glove front 15 and a glove back 17. The glove front and glove back define an opening 19 for accepting a human hand and a recess 21 for receiving the hand. As can be seen in FIG. 1, glove front 15 includes a palm portion 23 and a finger portion 25. Glove front 15 and glove back 17 are made of any desirable material such as leather, spandex, cloth, coated cloth, dipped material, etc. The particular material used is a function of the environment in which the glove is to be used and does not appear to significantly affect the antivibration properties of the glove.

A vibration dampener 27 is disposed in glove recess 21 adjacent glove front 15. As shown in exaggerated fashion in FIG. 2, this causes the front portion of glove 11 to be somewhat thicker that the back portion of the glove.

Figure 3:
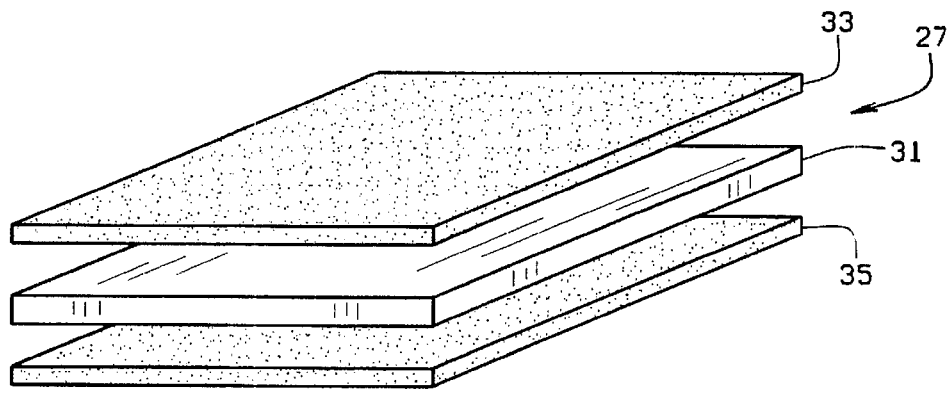
FIG. 3 is an exploded view of the construction of a vibration dampener used in the antivibration glove of FIG. 1.

The particular construction of vibration dampener 27 has been found to be significant in determining the antivibration properties of glove 11. It is preferred that vibration dampener 27 have at least first and second generally coterminous layers and is further preferred that it have three generally coterminous layers as shown in FIG. 3. For clarity of illustration, the various layers in FIG. 3 are shown as generally rectangular, but it should be understood that all layers in fact have the general hand-shape shown in FIG. 1.

It is preferred that the vibration dampener include coterminous layers of materials with differing properties. It is further preferred that at least one such layer be composed of a viscoelastic material having a Shore 00 durometer of less than 50 and a rebound percentage of less than 20. Such a layer is labeled 31 in FIG. 3. The second and optional third layers are preferably formed of a foam material. These layers are labeled 33 and 35 in FIG. 3 and form a sandwich construction in combination with viscoelastic layer 31.

The foam layers may be made of any suitable foam, and are preferably each between 70 and 150 thousands of an inch in thickness. For example, a ⅛" layer of polyether foam having an indentation force deflection of 25–35 psi and a pore density of 40 to 120 per inch has been found to work satisfactorily as layers 33 and 35. Similarly, a ⅛" layer of polyester foam having a compression load deflection of 25–55 psi (or more preferably approximately 40 psi) and a pore density in the above-mentioned range has also been found to work satisfactorily. Although these polyurethane foams work satisfactorily, other foams having similar physical properties could also be used.

The viscoelastic layer, layer 31, is generally in the form of a gel and may be made of any suitable material such as PVC, urethane or silicone rubber having the characteristics set forth above. It has been found that a PVC dispersion (plastisol) having a Shore 00 durometer of 38.5 and a rebound percentage of 13.5% works well as layer 31. The preferred material has a specific gravity of 1.12, although the specific gravity of the viscoelastic material is not believed to be critical. The plastisol is a relatively weak material in terms of tensile and elongation properties, so that it easily takes the shape of the glove as manipulated by the user.

Figure 4:
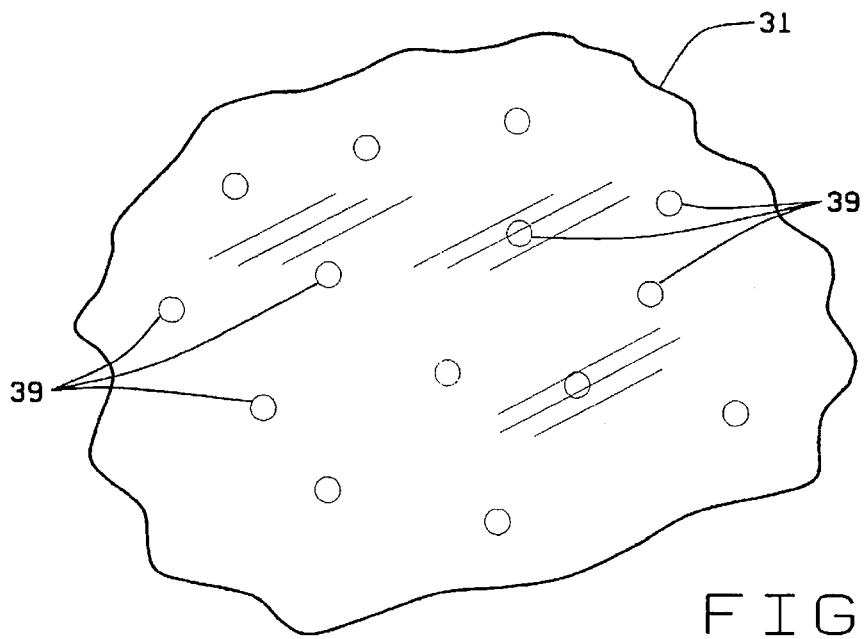
FIG. 4 is a top plan of a sheet of a particular material useful in the vibration dampener of FIG. 3.

As indicated in FIG. 4, it has been found that the presence of air bubbles 39 of a predetermined size and density embedded in viscoelastic layer 31 does not significantly reduce its antivibration properties and may, in fact, improve those properties. Such gas-filled voids may be generated deliberately or may be a natural consequence of a conventional manufacturing process. It is preferred that they be dispersed throughout the viscoelastic layer.

Figure 5:
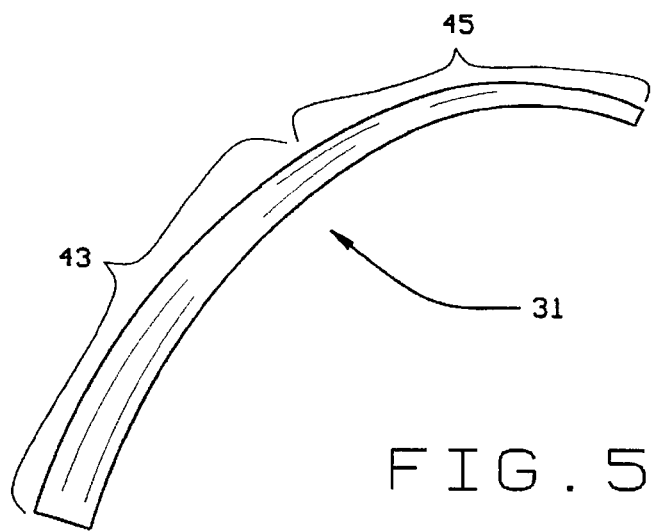
FIG. 5 is a side elevation of a preferred construction of a layer of viscoelastic material used in the vibration dampener of FIG. 3.

As shown in FIGS. 5 and 6, it is preferred that layer 31 of viscoelastic material be preformed in a non-uniform shape. For example, it is preferred that viscoelastic layer 31 be cast as a single piece in a precurved shape corresponding to the natural curvature of a human hand. (Of course, layer 31 could also be made of individual viscoelastic pieces suitably secured to the remainder of the glove, but this does increase the cost of construction.) The viscoelastic material itself is so pliable that the layer 31 does not force glove 11 into the precurved shape, but the precurved shape of this layer (and the material's memory of this shape) does facilitate bending and normal manipulation of the glove. Also shown in FIG. 5 is a taper of layer 31 which provides more vibration damping material near the palm and wrist (indicated by numeral 43) and correspondingly less material in the finger area (indicated by numeral 45). Alternatively, area 43 could be of a first, larger width, and area 45 could be of a second, narrower width. For example, a width of ¼" in the palm/wrist area, tapering down to ⅛" or so in the finger area has been found to provide desirable vibration dampening in the respective areas of the glove.

Turning to FIG. 6, finger creases 51 and palm creases 53 may be cast into viscoelastic layer 31 (or otherwise formed into the layer). These creases prevent bunching of the material (which makes the glove more comfortable to hold and eliminates an additional path for transmission of vibration), facilitate bending of the glove, and hence improve manipulation and control of the glove without significantly impacting upon the antivibration characteristics. It should also be noted (see FIG. 7), the width of the finger protrusions 57 in layer 31 is somewhat greater than the corresponding width of the glove fingers themselves. This allows the viscoelastic material to assume the curved shape shown in FIG. 7 around the side of the wearer's finger, thereby providing additional antivibration protection to each finger.

Although the present invention is described in connection with a glove with fingers, it should be appreciated that a fingerless glove could be constructed in the same manner by the simple expedient of omitting the finger portions of all the various layers. Except when the claims so require, it is anticipated that both fingered and fingerless gloves are included within the scope of the present invention.

It has been found that construction of an antivibration glove in accordance with the above description meets the aforementioned European standard. Specifically, as shown in FIG. 8, glove 11 dampens the applied vibration (when measured as specified in the standard) in the range of from 200 Hz to 1250 Hz by at least 40% for the palm portion and provides some antivibration protection for the finger portion of the glove (although the standard does not provide for testing the actual vibration protection at the fingers). Moreover, the glove has no resonant response greater than 1.0 below that range.

In view of the above, it will be seen that all the objects and features of the present invention are achieved, and other advantageous results obtained. The description of the invention contained herein is illustrative only, and is not intended in a limiting sense.

What is claimed is:

1. An antivibration glove comprising:
   a glove body having a glove front and a glove back, said glove front and glove back defining an opening for accepting a human hand and a recess for receiving said hand, said glove front including a palm portion and a finger portion;
   a vibration dampener essentially disposed in the glove recess adjacent the glove front, said vibration dampener having at least first and second generally coterminous layers, said first coterminous layer being composed of a viscoelastic material having a Shore 00 durometer of less than 50 and a rebound percentage of less than 20, said second coterminous layer being composed of a foam material.

2. The antivibration glove as set forth in claim 1 wherein the vibration dampener further includes a third layer, said third layer being coterminous with said first and second layers.

3. The antivibration glove as set forth in claim 2 wherein the first coterminous layer is sandwiched between the second and third coterminous layers.

4. The antivibration glove as set forth in claim 1 wherein the viscoelastic material is selected from the group consisting essentially of PVC, urethane and silicone rubber.

5. The antivibration glove as set forth in claim 1 wherein the viscoelastic material has a Shore 00 durometer no greater than about 40.

6. The antivibration glove as set forth in claim 1 wherein the rebound percentage of the viscoelastic material is no greater than about 15.

7. The antivibration glove as set forth in claim 1 wherein the viscoelastic material has a plurality of internally dispersed non-interconnecting gas-filled bubbles therein of a predetermined size and density.

8. The antivibration glove as set forth in claim 1 wherein said foam material has an indentation force deflection in the range of from 25 to 35 psi.

9. The antivibration glove as set forth in claim 1 wherein the foam material has between 40 and 120 pores per inch.

10. The antivibration glove as set forth in claim 1 wherein the second coterminous layer has a thickness of approximately $\frac{1}{8}$".

11. The antivibration glove as set forth in claim 10 further including a third coterminous layer, said layer having a thickness approximately the same as the thickness of the second layer.

12. The antivibration glove as set forth in claim 1 wherein the layer of viscoelastic material is preformed in a non-uniform shape.

13. The antivibration glove as set forth in claim 12 wherein the layer of viscoelastic material has creases therein to facilitate manipulation of the glove.

14. The antivibration glove as set forth in claim 12 wherein the layer of viscoelastic material is relatively thicker adjacent the palm portion and relatively thinner adjacent the finger portion.

15. The antivibration glove as set forth in claim 12 wherein the layer of viscoelastic material is tapered from the opening of the glove toward the opposite end of the glove.

16. The antivibration glove as set forth in claim 12 wherein the layer of viscoelastic material has a curved shape corresponding at least in part to the rest position of a human hand.

17. The antivibration glove as set forth in claim 1 wherein the layer of viscoelastic material adjacent the finger portion extends somewhat toward the glove back, so as to partially encircle the fingers of a human hand.

18. An antivibration glove comprising:
   a glove body having a glove front and a glove back, said glove front and glove back defining an opening for accepting a human hand and a recess for receiving said hand, said glove front including a palm portion and a finger portion; and
   a vibration dampener essentially disposed in the glove recess adjacent the glove front, said vibration dampener including a layer of viscoelastic material having internal non-interconnecting gas-filled bubbles disposed therein of a predetemined size and density.

19. The antivibration glove as set forth in claim 18 wherein said gas-filled bubbles are dispersed throughout the viscoelastic material.

20. An antivibration glove comprising:
   a glove body having a glove front and a glove back, said glove front and glove back defining an opening for accepting a human hand and a recess for receiving said hand, said glove front including a palm portion and a finger portion; and
   a vibration dampener consisting of at least one layer of viscoelastic material and at least one layer of foam material essentially disposed in the glove recess adjacent the glove front, said layer of viscoelastic material being of a predetermined non-uniform shape.

21. The antivibration glove as set forth in claim 20 wherein the layer of viscoelastic material has creases therein to facilitate manipulation of the glove.

22. The antivibration glove as set forth in claim 20 wherein the layer of viscoelastic material is relatively thicker adjacent the palm portion and relatively thinner adjacent the finger portion.

23. The antivibration glove as set forth in claim 20 wherein the layer of viscoelastic material is tapered from the opening of the glove toward the opposite end of the glove.

24. The antivibration glove as set forth in claim 20 wherein the layer of viscoelastic material has a curved shape corresponding at least in part to the rest position of a human hand.

25. An antivibration glove comprising:
   a glove body having a glove front and a glove back, said glove front and glove back defining an opening for accepting a human hand and a recess for receiving said hand, said glove front including a palm portion and a finger portion; and
   a vibration dampener consisting of at least one layer of viscoelastic material and at least one layer of foam material essentially disposed in the glove recess adjacent the glove front, said layer of viscoelastic material extending generally from the glove opening to the opposite end of the glove, said layer of viscoelastic material being relatively thicker near the glove palm area and ball of the thumb and relatively thinner adjacent the finger portion of the glove front.

26. The antivibration glove as set forth in claim 25 wherein the layer of viscoelastic material is tapered from the glove opening toward the finger portion.

27. An antivibration glove comprising:

a glove body having a glove front and a glove back, said glove front and glove back defining an opening for accepting a human hand and a recess for receiving said hand, said glove front including a palm portion and a finger portion;

a vibration dampener essentially disposed in the glove recess adjacent the glove front, said vibration dampener including a layer of viscoelastic material disposed adjacent at least the palm portion of the glove front, said layer of viscoelastic material being creased so as to facilitate manipulation of the glove.

28. The antivibration glove as set forth in claim 27 wherein at least a portion of the viscoelastic material disposed adjacent the finger portion is creased.

29. An antivibration glove comprising:

a glove body having a glove front and a glove back, said glove front and glove back defining an opening for accepting a human hand and a recess for receiving said hand, said glove front including a palm portion and a finger portion; and a vibration dampener consisting of at least one layer of viscoelastic material and at least one layer of foam material essentially disposed in the glove recess adjacent the glove front, said layer of viscoelastic material being disposed in the glove recess adjacent to the glove front and the palm portion of the glove front, and said layer of viscoelastic material being preformed in a curved shape corresponding at least partially to the rest position of a human hand.

30. An antivibration glove comprising:

a glove body having a glove front and a glove back, said glove front and glove back defining an opening for accepting a human hand and a recess for receiving said hand, said glove front including a palm portion and a finger portion; and a vibration dampener consisting of at least one layer of viscoelastic material and at least one layers of foam material essentially disposed in the glove recess adjacent the glove front, said vibration dampener extending from the palm portion to the finger portion of the glove front and dampening applied vibration in the range from 200 Hz to 1250 Hz by at least 40%.

31. The antivibration glove as set forth in claim 30 wherein below 200 Hz the vibration dampener has no resonant response greater than 1.0.

* * * * *

(12) EX PARTE REEXAMINATION CERTIFICATE (5278th)
United States Patent
Chase et al.

(10) Number: US 5,632,045 C1
(45) Certificate Issued: Feb. 28, 2006

(54) ANTIVIBRATION GLOVE

(75) Inventors: David D. Chase, Albuquerque, NM (US); Daniel A. Talonn, University City, MO (US)

(73) Assignee: Chase Ergonomics Inc., Albuquerque, NM (US)

Reexamination Request:
No. 90/006,747, Aug. 14, 2003

Reexamination Certificate for:
Patent No.: 5,632,045
Issued: May 27, 1997
Appl. No.: 08/436,655
Filed: May 8, 1995

(51) Int. Cl.
*A41D 13/00* (2006.01)

(52) U.S. Cl. .................. D2/161.6; 2/20; 2/455; 2/16; 2/167; 428/316.6; 428/318.4

(58) Field of Classification Search .............. 2/16, 2/20, 159, 161.1, 161.6, 167, 228, 238, 267, 2/401; 156/93, 308.4; 428/35.7, 36.8, 213, 428/424.8
See application file for complete search history.

(56) References Cited

U.S. PATENT DOCUMENTS

| | | | | |
|---|---|---|---|---|
| 3,606,614 A | * | 9/1971 | Dimitroff | 2/159 |
| 3,863,271 A | * | 2/1975 | Moroney | 2/161.2 |
| 4,015,604 A | * | 4/1977 | Csillag | 604/382 |
| 4,329,741 A | * | 5/1982 | Bach | 2/161.2 |
| 4,624,016 A | * | 11/1986 | Luevano | 2/19 |
| 5,214,799 A | * | 6/1993 | Fabry | 2/161.6 |
| 5,351,940 A | * | 10/1994 | Yano et al. | 267/153 |
| 5,528,772 A | * | 6/1996 | Cheek | 2/161.1 |
| 5,600,853 A | * | 2/1997 | Yewer, Jr. | 2/161.1 |

OTHER PUBLICATIONS

Sorbothane Internet Information Literature, www.sorbothane.com.*
1992 Ergodyne Catalog, p. 18.
www.sorbothane.com/custom₁₃ er2.html.
International Standard ISO 10819 (First Edition, Jun. 1, 1996).
Four (4) photographs of PF 900 glove identified in 1992 Ergodyne Catalog.
Cross–section of PF 900 glove identified in 1992 Ergodyne Catalog.

* cited by examiner

*Primary Examiner*—Gary L. Welch

(57) ABSTRACT

An antivibration glove includes a glove body with a front and back and a vibration dampener essentially disposed in the interior of the glove toward the palm side of the glove. The vibration dampener has at least a first layer composed of a viscoelastic material having a Shore 00 durometer of less than 50 and a rebound percentage of less than 20. Preferably the vibration dampener also includes second and third layers, coterminous with the first layer, which are composed of a foam material. The viscoelastic layer may have a non-uniform shape, such as precurved, tapered, or the like. In one embodiment the layer of viscoelastic material is relatively thicker near the glove palm area and ball of the thumb and relatively thinner adjacent the finger portion of the glove. The viscoelastic material may be creased to facilitate bending of the glove. The glove attenuates at least 40% of the applied vibration occurring in the range of from 200 Hz to 1250 Hz.

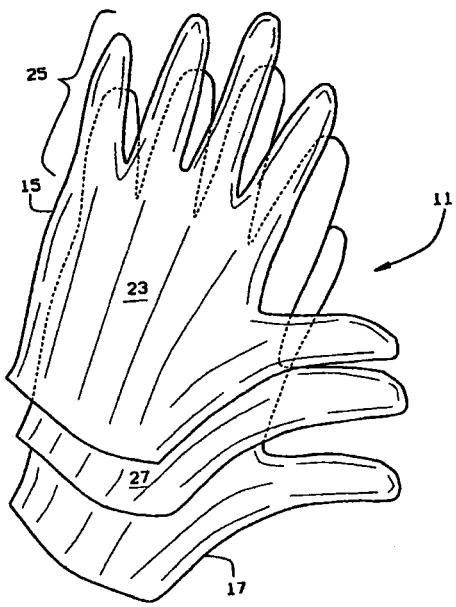

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patententability of claims 1–13, 15–17, 20, 21, 23, 24, 27, 28 and 29 is confirmed.

Claims 14, 18, 22, 25 and 30 are determined to be patentable as amended.

Claims 19, 26 and 31, dependent on an amended claim, are determined to be patentable.

14. The antivibration glove as set forth in claim 12 wherein the layer of viscoelastic material is relatively thicker [adjacent] *substantially throughout* the palm portion and relatively thinner adjacent the finger portion.

18. An antivibration glove comprising:
- a glove body having a glove front and a glove back, said glove front and glove back defining an opening for accepting a human hand and a recess for receiving said hand, said glove front including a palm portion and a finger portion; and
- a vibration dampener essentially disposed in the glove recess adjacent the glove front, said vibration dampener including a layer of viscoelastic material having internal non-interconnecting gas-filled bubbles disposed therein of a predetermined size and density, *and at least one layer of foam material essentially disposed in the glove recess adjacent the glove front*.

22. The antivibration glove as set forth in claim 20 wherein the layer of viscoelastic material is relatively thicker [adjacent] *throughout* the palm portion and relatively thinner adjacent the finger portion.

25. An antivibration glove comprising:
- a glove body having a glove front and a glove back, said glove front and glove back defining an opening for accepting a human hand and a recess for receiving said hand, said glove front including a palm portion and a finger portion, *said glove body having a closed end*; and
- a vibration dampener consisting of at least one layer of viscoelastic material and at least one layer of foam material essentially disposed in the glove recess adjacent the glove front, said layer of viscoelastic material extending generally from the glove opening to the opposite end of the glove, said layer of viscoelastic material being relatively thicker near the glove palm area and ball of the thumb and relatively thinner adjacent the finger portion of the glove front.

30. An antivibration glove comprising:
- a glove body having a glove front and a glove back, said glove front and glove back defining an opening for accepting a human hand and a recess for receiving said hand, said glove front including a palm portion and a finger portion; and
- a vibration dampener consisting of at least one layer of viscoelastic material and at least one layers of foam material essentially disposed in the glove recess adjacent the glove front, said vibration dampener extending from the palm portion to the finger portion of the glove front and dampening applied vibration [in] *throughout* the range from 200 Hz to 1250 Hz by at least 40%.

\* \* \* \* \*